(12) United States Patent
Kitamura

(10) Patent No.: US 7,880,944 B2
(45) Date of Patent: Feb. 1, 2011

(54) COMPUTER-GENERATED HOLOGRAM

(75) Inventor: Mitsuru Kitamura, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 12/483,879

(22) Filed: Jun. 12, 2009

(65) Prior Publication Data

US 2009/0244665 A1    Oct. 1, 2009

Related U.S. Application Data

(62) Division of application No. 10/551,986, filed as application No. PCT/JP2004/004830 on Apr. 2, 2004, now Pat. No. 7,564,606.

(30) Foreign Application Priority Data

Apr. 4, 2003  (JP)  ............................ 2003-101736

(51) Int. Cl.
G03H 1/08  (2006.01)
(52) U.S. Cl. ............................ 359/9; 359/23
(58) Field of Classification Search ...................... 359/9
See application file for complete search history.

(56) References Cited

U.S. PATENT DOCUMENTS

| | | | |
|---|---|---|---|
| 5,561,537 A | 10/1996 | Aritake et al. | |
| 6,813,048 B2 * | 11/2004 | Kitamura | 359/9 |
| 7,046,405 B2 * | 5/2006 | Kitamura et al. | 359/9 |
| 7,068,403 B2 | 6/2006 | Kitamura | |
| 7,564,606 B2 * | 7/2009 | Kitamura | 359/9 |

FOREIGN PATENT DOCUMENTS

| | | |
|---|---|---|
| JP | 9-134112 | 5/1997 |
| JP | 2001-13858 | 1/2001 |
| JP | 2002-72837 | 3/2002 |
| JP | 2002-91272 | 3/2002 |

\* cited by examiner

*Primary Examiner*—Arnel C Lavarias
(74) *Attorney, Agent, or Firm*—patenttm.us

(57) ABSTRACT

To prepare very high resolution computer-generated hologram having many numbers of parallaxes, a computer-generated holographic stereogram, with virtual point light source group set up spatially on a side opposite to the hologram observation side, luminance angular distribution $A_{WLci}$ ($\theta_{xz}$, $\theta_{yz}$) of divergent light from each virtual point light sources of said group toward observation side is divided by angular division, and within the divided angle, among the multiple images positioned on the plane of said group, divergent light equal to the divergent light diverged from a point of amplitude equal to the density of pixel of each divided angle corresponding image or equal to a value in a certain fixed relation with the density of the images at the position of the virtual point light source is recorded as the object light at one of the positions on the observation side of the virtual point light source group.

2 Claims, 6 Drawing Sheets

COMPUTER-GENERATED HOLOGRAM

FIELD OF THE INVENTION

The present invention relates to a computer-generated hologram. In particular, the invention relates to a computer-generated holographic stereogram with high resolution and with many numbers of parallaxes.

BACKGROUND ART

A stereogram is known as a medium, which can be observed by an observer by changing over a plurality of images depending on the direction of observation. The stereogram widely used at present has a lens array such as lenticular lens, fly-eye lens, etc. arranged on a printing medium.

When this type of stereogram is used, by changing the direction of observation, a plurality of entirely different images can be changed over for observation of an observer. Also, when the stereogram is used, by changing the direction of observation, an image of a 3-dimensional object can be observed from a direction to match the direction of observation. In this case, the observer can observe the 3-dimensional object with stereoscopic effect. Further, when the stereogram is used, by changing the direction of observation, a plurality of images gradually changing can be observed by an observer. In this case, the observer can observe the plurality of changing images as a series of animated images. The display of the changeover of a plurality of images, the display of images with stereoscopic effect, and the display of images with animation effect as described above can be combined together and used at the same time.

In addition to the stereogram, in the Patent Reference 1, a screen is proposed, which comprises a group of pixels, and each pixel is divided to a plurality of regions. Then, different diffraction grating is assigned to each region so that, when it is seen from different directions, different images can be observed as an assembly of diffraction grating regions to project diffracted light in the direction.

[Patent Reference]
Japanese Patent Publication No. 2795698
[Patent Reference 2]
JP-A-2002-72837
[Non-Patent Reference 1]
Junpei Tsujiuchi: "Physics Selection 22; Holography", pp. 33-36 (published by Shokabo Co., Ltd.; Nov. 5, 1997).

The stereogram comprising a printed matter with a lens array such as lenticular lens, fly-eye lens, etc. as described above requires physical pixel structure (lens array). Thus, it is disadvantageous in that the product has low resolution and is too thick. Also, it requires fine and minute printing and the printing area is limited. In this respect, it is not possible to attain the following two purposes: the improvement of resolution and the increase of number of parallaxes.

According to the patent reference 1, pixels in limited size are cut in each direction of parallax and diffraction grating is assigned and used. This also requires a limited area, and it is not possible to attain the two purposes as given above: the improvement of resolution and the increase of number of parallaxes.

To solve the problems of the prior art as described above, it is an object of the present invention to provide a computer-generated holographic stereogram, which has very high resolution and many numbers of parallaxes.

DISCLOSURE OF THE INVENTION

To overcome the disadvantages of the prior art as described above, a first computer-generated hologram according to the present invention is a computer-generated hologram for selectively reproducing a plurality of images depending on the direction of observation where complex amplitude of an object wave is recorded, wherein:

a virtual point light source group is set up spatially on a side opposite to the observation side of the hologram, luminance angular distribution $A_{WLci}$ ($\theta_{xz}$, $\theta_{yz}$) of divergent light diverged from each of the virtual point light sources of said virtual point light source group toward observation side is divided by angular division, and within the divided angle, among the multiple images positioned on the plane of said virtual point light source group, a divergent light diverged from a point of amplitude equal to the density of pixel of the image corresponding to each of divided angle or equal to a value in a certain fixed relation with the density of the images at the position of the virtual point light source is recorded as the object light at one of the positions on the observation side of the virtual point light source group.

In this case, each of the virtual point light sources in the virtual point light source group is a point light source where the spreading direction of the light is mono-dimensional, and it may comprise a linear light source, which extends in a direction perpendicularly crossing the spreading direction.

A second computer-generated hologram of the present invention is a computer-generated hologram for selectively reproducing a plurality of images depending on the direction of observation where complex amplitude of an object wave is recorded, wherein:

when a predetermined illuminating light enters, a diffracted light is reconstructed, which advances as it is diverged toward observation side from each of the points of spatial virtual point group on a side opposite to observation side of the hologram, luminance angular distribution of the light is divided by angular division depending on the direction of diffraction angle so that the light is diverged from each virtual point toward the observation side of the hologram, and the diffracted light is equal to the divergent light diverging from a point with an amplitude equal to the density of pixel of the image corresponding to each divided angle or equal to a value in a certain fixed relation with the density at the position of the virtual point of the recorded images among the separate recorded images positioned on the plane of said virtual point group within the divided angle.

In this case, each of the virtual points of the virtual point group is a point where the spreading direction of the light is mono-dimensional, and it may comprises a straight line extending in a direction perpendicularly crossing the spreading direction.

A third computer-generated hologram of the present invention is a computer-generated hologram for selectively reproducing a plurality of images depending on the direction of observation where complex amplitude of an object wave is recorded, wherein:

a virtual light converging point group is spatially set up on observation side of the hologram, luminance angular distribution $T_{WLci}$ ($\theta_{xz}$, $\theta_{yz}$) of converged light entering from the side opposite to the observation side to each of the virtual light converging points of said virtual light converging point group is divided by angular division, and within the divided angle, among the multiple images positioned on the plane of said virtual light converging point group, these converging lights are converged to a point of amplitude equal to the density of pixel of the image corresponding to each of the divided angle or equal to a value in a certain fixed relation with the density of the images at the position of the virtual light converging point, and the converging lights are recorded as the object light at one of the positions on a side opposite to the observation side of the virtual light converging point group.

In this case, each of virtual light converging points of the virtual light converging point group is a light converging point where the spreading direction of the light is mono-dimensional, and it may comprise a linear light converging light extending in a direction perpendicularly crossing the spreading direction.

A fourth computer-generated hologram of the present invention is a computer-generated hologram for selectively reproducing a plurality of images depending on the direction of observation where complex amplitude of an object wave is recorded, wherein:

when a predetermined illuminating light enters, a diffracted light is reconstructed, which is diverged at observation side through each point of spatial virtual point group on the observation side of the hologram, luminance angular distribution of the light converged to each virtual point is divided by angular division depending on the direction of diffraction angle, and among the separate recorded images positioned on the plane of said virtual point group within each of the divided angles, these converging lights are the diffracted lights converged to a position of amplitude equal to the density of pixel of the image corresponding to each divided angle or equal to a value in a certain fixed relation with the density at the position of virtual point of the recorded images, and the converged lights are reconstructed in this manner.

In this case, each of the virtual points of the virtual point group is a point where spreading direction of the light is mono-dimensional, and it may comprise a straight line extending in a direction perpendicularly crossing the spreading direction.

In the present invention, on a plane where a plurality of images such as parallax images are reconstructed and which is separated from the plane of the hologram, a multiple of virtual point light sources with luminance equal to the luminance of the position of the images different depending on radiating direction or a multiple of virtual light converging points with luminance equal to the luminance of the directions of the images different depending on light converging direction are defined. Light components radiated from these virtual point light sources or light components converged to these virtual light converging points are regarded as virtual object light, and a computer-generated hologram is prepared by using these light components. As a result, a computer-generated hologram can be prepared by using a light radiated from these virtual point light sources or a light converged to these virtual light converging points. Thus, it is possible to obtain a computer-generated hologram, which has high resolution and can record and reconstruct a multiple of images and which does not require hologram photographing. The present invention provides, for instance, a computer-generated holographic stereogram, which has high resolution and has many numbers of parallaxes.

BEST MODE FOR CARRYING OUT THE INVENTION

The basic principle of a computer-generated hologram according to the present invention is as follows:

On a plane where a plurality of images such as parallax images is reconstructed and which is separated from the plane of the hologram, a multiple of virtual point light sources with luminance of the positions of the images different depending on radial direction or a multiple of virtual light converging points with luminance equal to the luminance of the positions of the images different depending on light converging direction are defined. Light components radiated from these virtual point light sources or light components converged to these virtual light converging points are regarded as virtual object light, and a computer-generated hologram is prepared using these light components. As a result, images with high resolution and with many numbers of parallaxes can be recorded. Thus, a computer-generated hologram (CGH) is prepared, which requires no hologram photographing.

Description will be given below on general principle of the computer-generated hologram according to the present invention.

Figure 1:
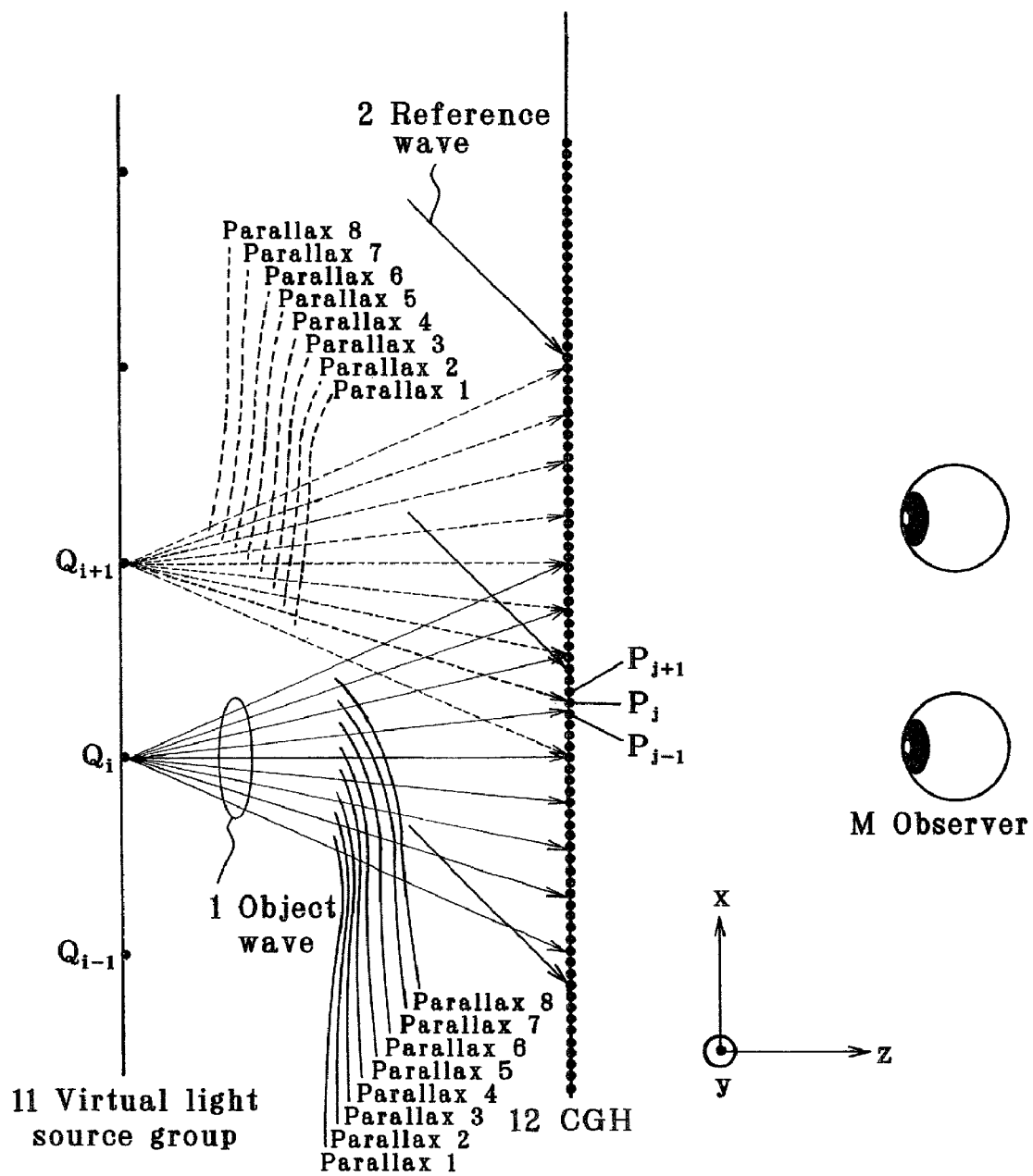
FIG. 1 is a drawing to explain a principle of a computer-generated hologram according to the present invention.

As shown in FIG. 1, which represents the basic principle, a virtual point light source group 11, a CGH 12, and observers M are provided in (+) direction along z-axis in this order. The center of the CGH 12 is regarded as the origin of coordinates, and x-axis and y-axis cross each other perpendicularly. These axes also cross z-axis perpendicularly. It is supposed that the coordinates of the virtual point light source group 11 are $(x_1, y_1, z_1)$, and the coordinates of the CGH 12 are $(x_2, y_2, z_2)$. Then, i-th virtual point light source is defined as $Q_i(x_1, y_1, z_1)$ and j-th cell of CGH 12 is defined as $P_j(x_2, y_2, z_2)$. It is assumed that a view point of an observer M is on an extension of a straight line $Q_iP_j$. The luminance with wavelength $\lambda_c$ in the directions $\theta_{xz}$ and $\theta_{yz}$ at the virtual point light source $Q_i$ $(x_1, y_1, z_1)$, observable from the view point of the observer M, is defined as $A_{WLci}(\theta_{xz}, \theta_{yz})$. Here, $\theta_{xz}$ is an angle with respect to z-axis when the straight line $Q_iP_j$ is incident to the plane x-z, and $\theta_{yz}$ is an angle with respect to z-axis when the straight line $Q_iP_j$ is incident to the plane y-z.

It is supposed now that initial phase of the virtual point light source $Q_i$ is $\phi_{WLci}$, and a distance between $Q_i$ and $P_j$ is $r_{ij}$. Then, a complex amplitude value $O_{WLc}(x_2, y_2, z_2)$ is given as:

$$O_{WLc}(x_2, y_2, z_2) = \sum_{l=1}^{N} \left\{ \frac{A_{WLci}(\theta_{xz}, \theta_{yz})/}{|r_{ij}|} \right\} \times \exp\left[ j \left\{ \frac{(2\pi/\lambda_c)r_{ij} +}{\phi_{WLci}} \right\} \right] \quad (1)$$

where N represents the number of $Q_i$.

A luminance $A_{WLci}(\theta_{xz}, \theta_{yz})$ from the virtual point light source $Q_i(x_1, y_1, z_1)$ is divided by angular division with respect to $\theta_{xz}$ and $\theta_{yz}$. In each of the divided angles, the density of pixel of the image of the image corresponding to the divided angle at the position of the virtual point light source $Q_i$ ($x_1$, $y_1$, $z_1$) of the image is assigned. For instance, the angle $\theta_{xz}$ is divided to $\theta_{xz0} \sim \theta_{xz1} \sim \theta_{xz2} \sim \ldots \sim \theta_{xzm}$ within angle range of $-\pi/2$ to $\pi/2$, and the angle $\theta_{yz}$ is divided to $\theta_{yz0} \sim \theta_{yz1} \sim \theta_{yz2} \sim \ldots \sim \theta_{yzn}$ within angle range of $-\pi/2$ to $\pi/2$ to have equal angular distance. Then, the density $I_{11i}$ at the position of the virtual point light source $Q_1$ of the image $I_{11}$ is assigned to the range of $\theta_{xz0} \sim \theta_{xz1}$ and to the range of $\theta_{yz0} \sim \theta_{yz1}$. The density $I_{21i}$ at a position of the virtual point light source $Q_i$ of the image $I_{21}$ is assigned to the range of $\theta_{xz1} \sim \theta_{xz2}$ and $\theta_{yz1} \sim \theta_{yz1}$. The density $I_{mni}$ at a position of the virtual point light source $Q_i$ of the image $I_{mn}$ is assigned to the range of $\theta_{xzm-1} \sim \theta_{xzm}$ and $\theta_{yzn-1} \sim \theta_{yzn}$.

Explaining in simpler manner, in FIG. 1, the object wave 1 emitted in the direction of parallax 1 from the virtual point light source $Q_1$ ($x_1$, $y_1$, $z_1$) is turned to a wave, which has the density at pixel position i of a first image $I_{mn}$ (e.g. a letter "A") as the amplitude of the virtual point light source. The object wave 1 emitted in the direction of parallax 2 is turned to a wave, which has the density at pixel position i of a second image $I_2$ (e.g. the letter "B") as the amplitude of the virtual point light source. Similarly, the object wave 1 emitted in the direction of parallax 8 is turned to a wave, which has the density at pixel position i of an 8th image $I_8$ (e.g. a letter "H") as the amplitude of the virtual point light source. Then, the object wave 1 is generated, which has the density at pixel position i of the letters "A", "B", ... "H" corresponding to parallax direction as amplitude at the same time. This object wave 1 is given by the equation (1).

Here, the density is supposed to be a value, which takes a bigger value when brightness is high as generally used in digital image. (It is considered that, when black and white are compared with each other, white has higher density.)

Here, it is supposed that incident vector of a reference light 2, which consists of parallel lights entering the CGH 12 is ($R_x$, $R_y$, $R_z$), and that the amplitude of the wavelength $\lambda_c$ is $R_{WLc0}$. Also, it is supposed that the phase at the origin of coordinates is $\phi_{RWLc}$. Then, complex amplitude value $R_{WLc}$ ($x_2$, $y_2$, $z_2$) is given as:

$$R_{WLc}(x_2,y_2,z_2) = R_{WLc0} \cdot \exp[j\{(2\pi/\lambda_c) \times (R_x x_2 + R_y y_2 + R_z z_2)/(R_x^2 + R_y^2 + R_z^2)^{1/2} + \phi_{RWLc}\}] \quad (2)$$

The intensity $I_{WLc}$ ($x_2$, $y_2$, $z_2$) of interference fringes caused by the object wave 1 at $P_j$ ($x_2$, $y_2$, $z_2$) and the reference light 2 are given by:

$$I_{WLc}(x_2,y_2,z_2) = |O_{WLc}(x_2,y_2,z_2) + R_{WLc}(x_2,y_2,z_2)|^2 \quad (3)$$

In the above, a distance $r_{ij}$ between $Q_i$ and $P_j$ is given as:

$$r_{ij} = \{(x_2-x_1)^2 + (y_2-y_1)^2 + (z_2-z_1)^2\}^{1/2} \quad (4)$$

An angle $\theta_{xz}$ with respect to z-axis when the straight line $Q_i P_j$ is incident to the plane x-z is given as:

$$\theta_{xz} = \tan^{-1}\{(x_2-x_1)/(z_2-z_1)\} \quad (5)$$

An angle $\theta_{yz}$ with respect to z-axis when the straight line $Q_i P_j$ is incident to the plane y-z is given as:

$$\theta_{yz} = \tan^{-1}\{(y_2-y_1)/(z_2-z_1)\} \quad (6)$$

Initial phase $\phi_{WLci}$ of the virtual point light source $Q_i$ is set to a fixed value between the virtual point light sources $Q_1$ regardless of the relation of the virtual point light sources to each other.

As it is evident from the above description, a multiple of virtual point light sources $Q_i$ ($x_1$, $y_1$, $z_1$) are set up on planes of a plurality of images $I_{11}$, $I_{21}$, ..., $I_{mn}$, which can be recorded and reconstructed on the same plane as the CGH 12.

Luminance angular distribution $A_{WLci}$ ($\theta_{xz}$, $\theta_{yz}$) of divergent light radiated from each of the virtual point light sources $Q_i$ is divided depending on the direction of the radiant angle. Within different divided angle, luminance is set to a value equal to the density $I_{11i}$, $I_{21i}$, ..., $I_{mni}$ at the position of the virtual point light source $Q_1$ of different images $I_{11}$, $I_{21}$, ..., $I_{mn}$. The initial phase $\phi_{WLCi}$ of the virtual point light source $Q_1$ is set to a constant value between the virtual point light sources $Q_i$ regardless of the relation to each other. Then, the phase and the amplitude of the divergent light from the virtual point light source $Q_i$ are holographically recorded (recording of interference with the reference light 2). As a result, by the CGH 12 of the present invention, images $I_{11}$, $I_{21}$, ..., $I_{mn}$ different depending on the direction of observation can be obtained.

Figure 2:
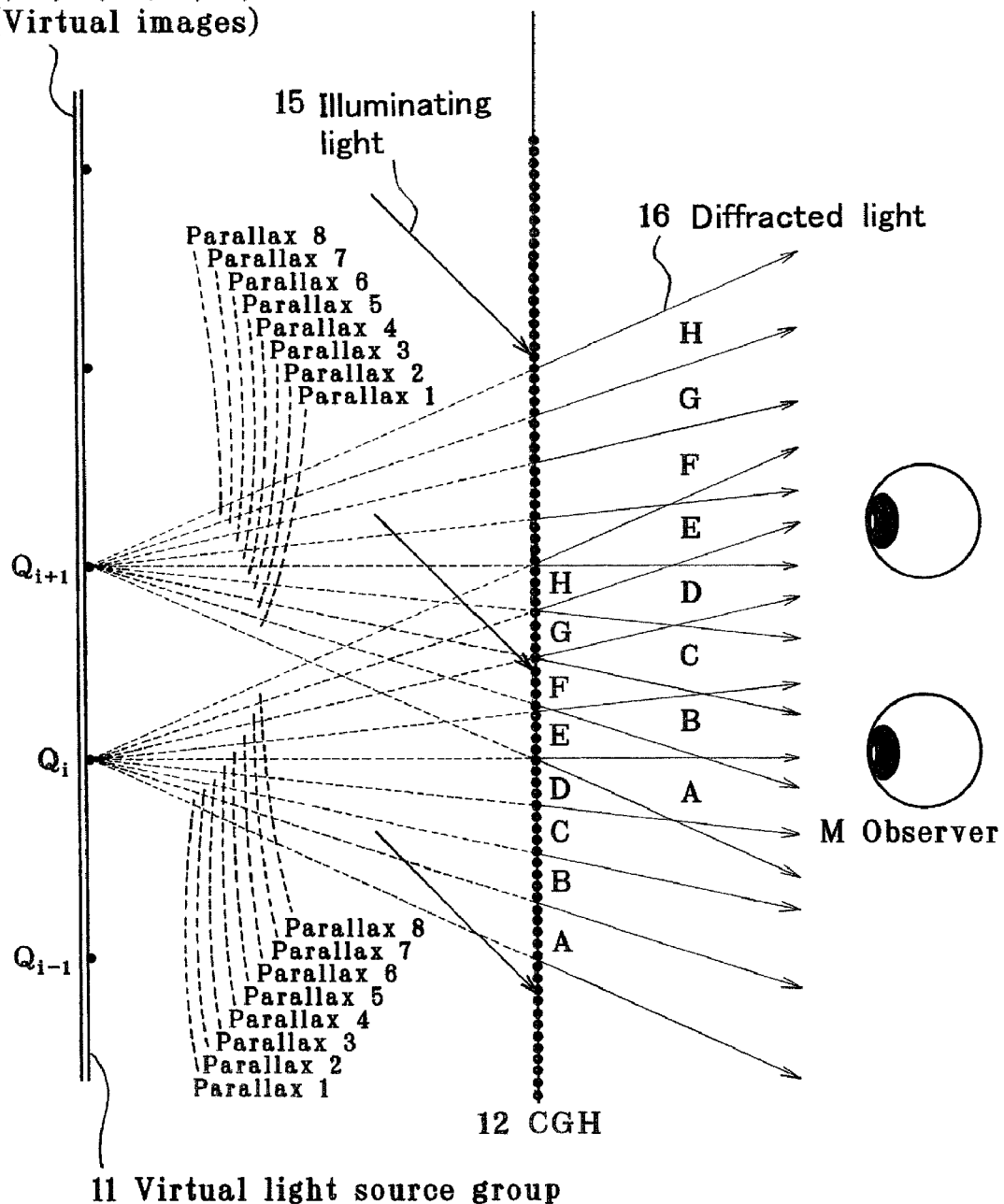
FIG. 2 is a drawing to explain how an observer can selectively observe different images depending on the direction of parallax through the computer-generated hologram as shown in FIG. 1.

When an illuminating light 15 with the same wavelength $\lambda_c$ as the reference light 2 is incident at the same incident angle as that of the reference light 2 to the CGH 12 as shown in FIG. 2, the images $I_{11}$, $I_{21}$, ..., $I_{mn}$ are reconstructed on the plane of the virtual point light source group 11 as virtual images by a diffracted light 16 diffracted from the CGH 12. However, the diffracted light 16 relating to the images $I_{11}$, $I_{21}$, ..., $I_{mn}$ is divided in angle depending on the direction of diffraction angle. From the position of the virtual point light sources $Q_1$ ($x_1$, $y_1$, $z_1$) on the planes of the virtual point light source group 11, the diffracted light 16 to reconstruct the image $I_{11}$ is diffracted in the range of $\theta_{xz0} \sim \theta_{xz1}$ and $\theta_{yz0} \sim \theta_{yz1}$. The diffracted light 16 to reconstruct the image $I_{21}$ is diffracted in the range of $\theta_{xz1} \sim \theta_{xz2}$ and $\theta_{yz0} \sim \theta_{yz1}$. The diffracted light to reconstruct the image $I_{mn}$ is diffracted in the range of $\theta_{xzm-1} \sim \theta_{xzm}$ and $\theta_{yzn-1} \sim \theta_{yzx}$.

Explaining in simpler manner by referring to FIG. 2, by the diffracted light 16 emitted in the direction of parallax 1 from the virtual point light source $Q_i$ ($x_1$, $y_1$, $z_1$), it is turned to a wave, which has the density of pixel at a position of the virtual point light source $Q_i$ ($x_1$, $y_1$, $z_1$) of a first image $I_1$ (e.g. the letter "A") as amplitude. By the diffracted light 16 emitted in the direction of parallax 2, it is turned to a wave, which has the density of pixel at a position of the virtual point light source $Q_i$ ($x_1$, $y_1$, $z_1$) of a second image $I_2$ (e.g. the letter "B") as amplitude. Similarly, the object wave 1 emitted in the direction of parallax 8 is turned to a wave, which has the density of pixel at a position of the virtual point light source $Q_i$ ($x_1$, $y_1$, $z_1$) of an eighth image $I_8$ (e.g. the letter "H") as amplitude. When the observer M observes CGH 12 from a parallax direction, these images "A", "B", ..., "H" can be selectively observed as an assembly of all pixels on the planes of the virtual point light sources, depending on the direction of parallax. Also, when the observer shifts the view point, these images "A", "B", ..., "H" can be observed as if these are changed over with each other.

Figure 3:
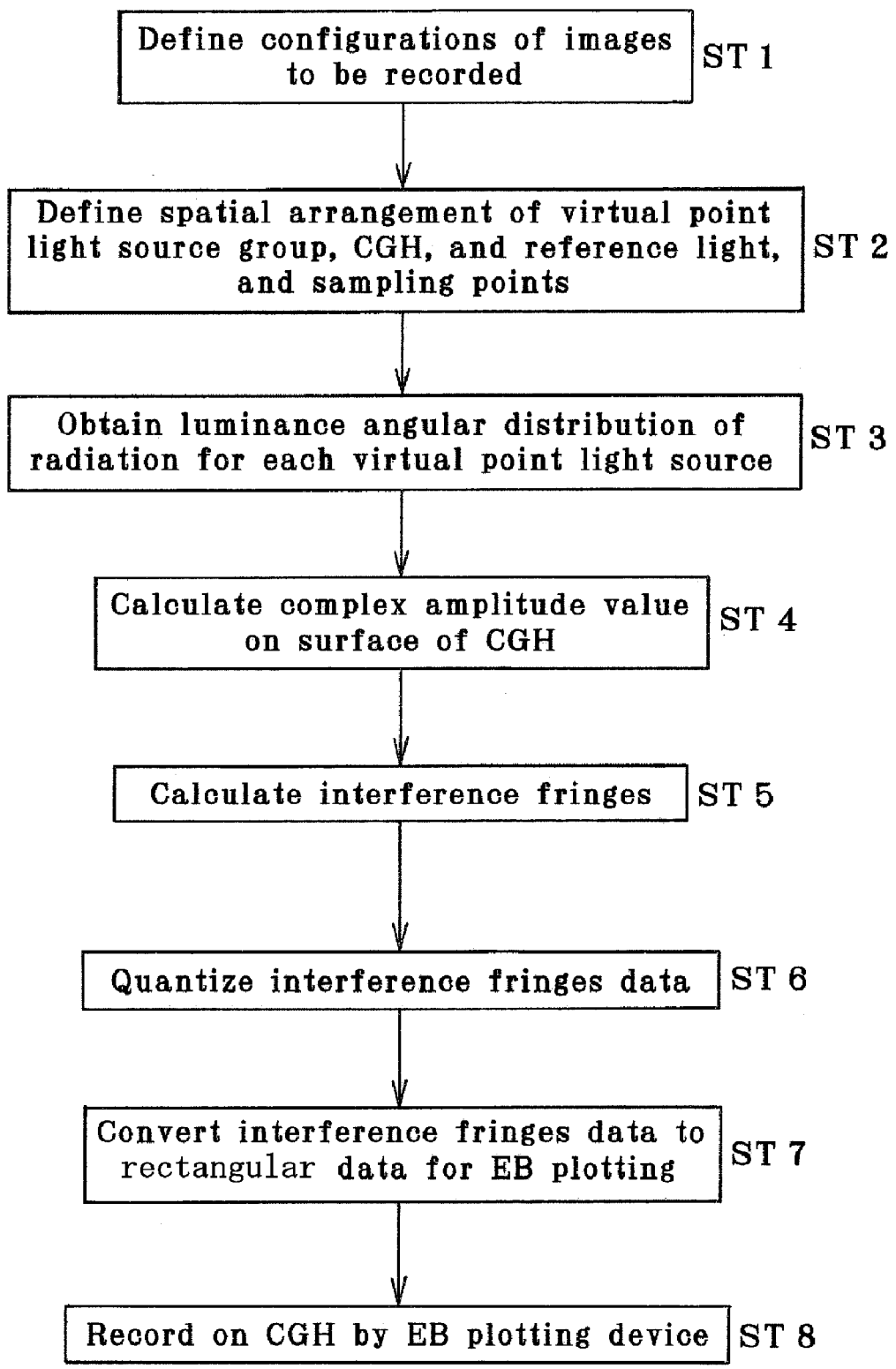
FIG. 3 is a flow chart to explain a method for preparing the computer-generated hologram as shown in FIG. 1.

Next, description will be given on a method to prepare the CGH 12 as described above as a binary hologram by referring to FIG. 3. In Step ST1, a plurality of images $I_{11}$, $I_{21}$, ..., $I_{mn}$ are defined. Next, in Step ST2, spatial arrangement of the virtual point light source group 11, the CGH 12 and the reference light 2 as well as a sampling point ($Q_1$) of the virtual point light source group 11 and a sampling point (P) of the CGH 12 are defined. Next, in Step ST3, luminance angular distribution $A_{WLci}$ ($\theta_{xz}$, $\theta_{yz}$) is divided by angular division depending on the direction of radiant angle. Then, the luminance of the different images $I_{11}$, $I_{21}$, ..., $I_{mn}$ within the divided angle is obtained as a luminance equal to the density $I_{11}$, $I_{21}$, ..., $I_{mn}$ at the position of the virtual point light source $Q_1$. In Step ST4, a complex amplitude value $O_{WLc}$ ($x_2$, $y_2$, $z_2$) of the object light on the plane of the CGH 12 and a complex amplitude value $R_{WLc}$ (x.sub.2, y.sub.2, z.sub.2) of the reference light 2 are calculated according to the equations (1) and (2). Then, in Step ST5, intensity of interference fringes of the object light and the reference light is obtained at each of the sampling points defined on the plane of the CGH 12 according to the equation (3), and the data of the interference fringes are obtained. Next, in Step ST6, the data of interference fringes thus obtained are quantized. In Step ST7, the data are converted to rectangular data for EB (Electron Beam) lithography. In Step ST8, the data are recorded on a medium by EB lithography device and the CGH 12 is obtained.

In the case shown in FIG. 1, it is designed that the object wave from the virtual point light source $Q_i$ enters all cells $P_j$ of the CGH 12 in x direction and y direction. However, it may be designed in such manner that the virtual point light source group 11 and the CGH 12 are divided by a multiple of slicing planes perpendicular to y-axis, and radiation range of the object wave may be limited within the slicing planes.

Also, a point light source within 2-dimensional plane is used as the virtual point light source, while it may be designed in such manner that a linear light source extending in y direction and not spreading in y direction may be used.

Further, in the case shown in FIG. 1, the method based on the interference with the reference light 2 is used for the purpose of fixing the complex amplitude value $Q_{WLc}$ ($x_2$, $y_2$, $z_2$) of the object light (object wave) 1 as hologram, while the method of Lohmann or the method of Lee (non-patent reference 1) to directly reconstruct complex amplitude of the object wave may be used. Also, the method proposed by the present inventor in the patent reference 2 may be used. In the explanation for FIG. 1, the value of the image to match the luminance angular distribution Audi ($\theta_{xz}$, $\theta_{yz}$) of the divergent light emitted from each of the virtual point light sources $Q_i$ is used as the density of the pixel at the position of the virtual point light source $Q_i$. However, it is not limited to this, and a value in a certain relation with the density of the pixel may be used. For instance, by supposing that the density is X, a value $\sqrt{X}$, $X^{1/a}$ may be used (where "a" is a constant).

Figure 4:
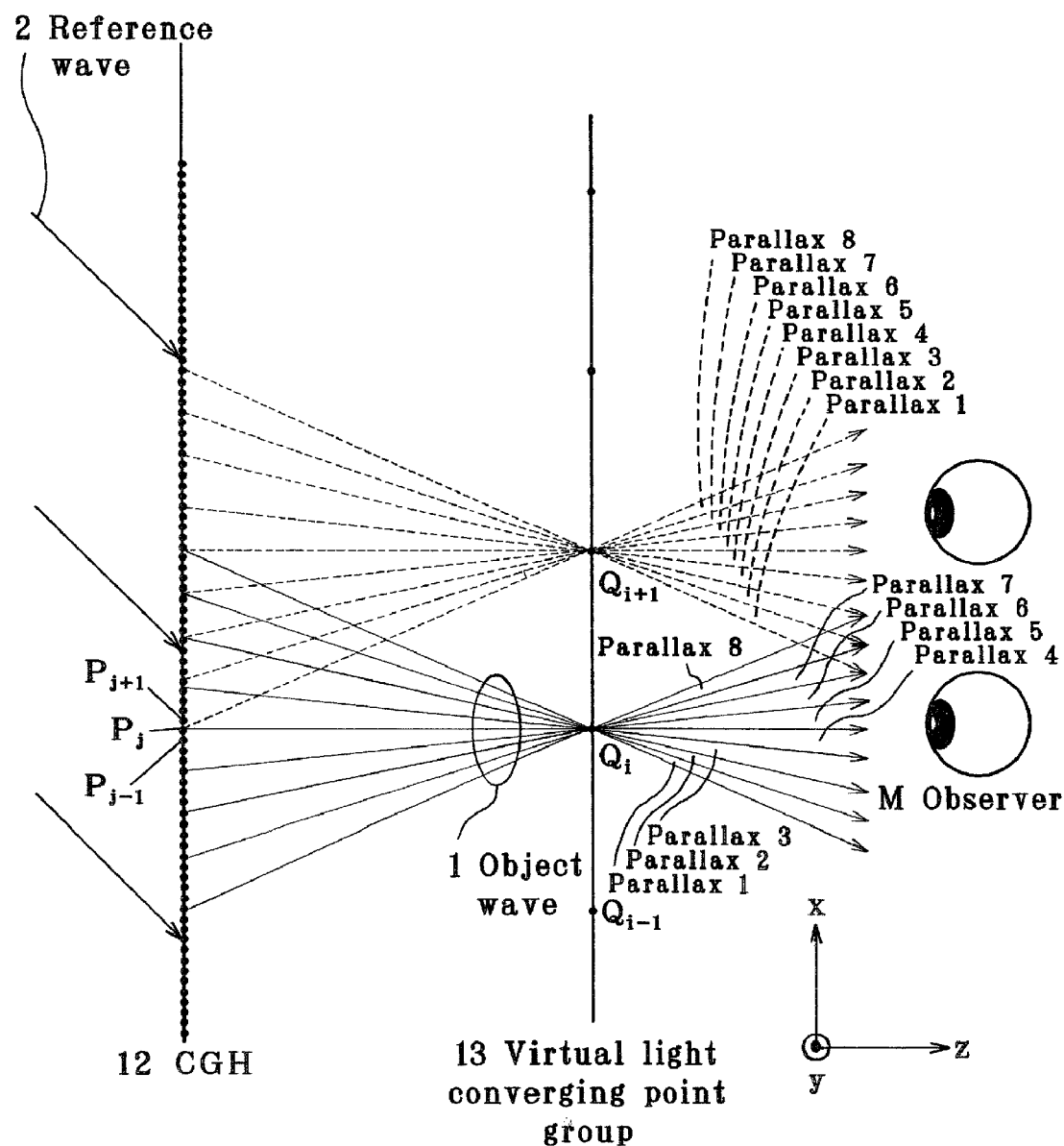
FIG. 4 is a drawing to explain another embodiment of the computer-generated hologram of the present invention.

FIG. 4 is a drawing to explain another embodiment of the computer-generated hologram according to the present invention. In this embodiment, the virtual point light source group 11 in FIG. 1 is replaced with the CGH 12, and the virtual point light source group 11 is replaced by the virtual light converging point group 13. As shown in FIG. 4, the CGH 12, the virtual light converging point group 13, and the observers M are arranged in (+) direction along z-axis in this order. The center of the CGH 12 is regarded as the origin of the coordinates. It is defined that x-axis and y-axis run perpendicularly to each other, and that these are running perpendicularly to z-axis. The coordinates of the virtual light converging point group 13 are set to ($x_1$, $y_1$, $z_1$) and the coordinates of the CGH 12 are set to ($x_2$, $y_2$, $z_2$). The i-th virtual light converging point is set to $Q_i$ ($x_1$, $y_1$, $z_1$) (using the same symbol as in the virtual light converging point sources), and the j-th cell of the CGH 12 is defined as $P_j$ ($x_2$, $y_2$, $z_2$). It is supposed that the view point of the observer M is on an extension of the straight line $Q_iP_j$, and that the luminance at wavelength $\lambda_c$ in the direction $\theta_{xz}$ and $\theta_{yz}$ at the virtual light converging point $Q_i$ ($x_1$, $y_1$, $z_1$) is $T_{WLci}$ ($\theta_{xz}$, $\theta_{yz}$). Here, $\theta_{xz}$ is an angle with respect to z-axis when the straight line $Q_iP_j$ is incident to the plane x-z, and $\theta_{yz}$ is an angle with respect to z-axis when the straight line $Q_iP_j$ is incident to the plane y-z.

It is supposed here that the initial phase of the virtual light converging point $Q_i$ is $\phi_{WLci}$, and a distance between $Q_i$ and $P_j$ is $r_{ij}$. Then, a complex amplitude value $O_{WLc}$ ($x_2$, $y_2$, $z_2$) of the object wave entering $P_j$ ($x_2$, $y_2$, $z_2$) is as given below, instead of the above equation (1):

$$O_{WLc}(x_2, y_2, z_2) = \sum_{i=1}^{N} \left\{ \frac{T_{WLci}(\theta_{xz}, \theta_{yz})/}{|r_{ij}|} \right\} \times \exp\left[ j\left\{ \frac{-(2\pi/\lambda_c)|r_{ij}| +}{\phi_{WLci}} \right\} \right] \quad (1')$$

where N represents the number of $Q_i$.

Radiant luminance $T_{WLci}$ ($\theta_{xz}$, $\theta_{yz}$) emitted toward the observer from the virtual light converging point $Q_i$ ($x_1$, $y_1$, $z_1$) is divided by angular division with respect to $\theta_{xz}$ and $\theta_{yz}$. Then, the density of pixel is assigned at a position of the virtual light converging point of an image corresponding to each dividing angle for each image within the divided angle. For example, the angle $\theta_{xz}$ is divided to $\theta_{xz0} \sim \theta_{xz1} \sim \theta_{xz2} \sim \ldots \theta_{xzm}$ within the angle range of $-\pi/2$ to $\lambda/2$. The angle $\theta_{yz}$ is divided to $\theta_{yz0} \sim \theta_{yz1} \sim \theta_{yz2} \sim \ldots \theta_{yzn}$ within angle range of $-\pi/2$ to $\pi/2$ with equal angular spacing between them. The density $I_{11i}$ at the position of the virtual light converging point $Q_i$ of the image $I_{11}$ is assigned to the ranges of $\theta_{xz0} \sim \theta_{xz1}$ and $\theta_{yz0} \sim \theta_{yz1}$. The density $I_{21i}$ at the position of the virtual light converging point $Q_i$ of the image $I_{21}$ is assigned to the ranges of $\theta_{xz1} \sim \theta_{xz2}$ and $\theta_{yz0} \sim \theta_{yz1}$. The density $I_{mni}$ at the position of the virtual light converging point $Q_i$ of the image $I_{mn}$ is assigned to the ranges of $\theta_{xzm-1} \sim \theta_{xzm}$ and $\theta_{yzn-1} \sim \theta_{yzn}$ as luminance within the divided angle.

Explaining in simpler manner, in FIG. 4, the object wave 1 emitted in the direction of parallax 1 after converging to the virtual light converging point $Q_i$ ($x_1$, $y_1$, $z_1$) is turned to a wave, which has the density at the pixel position i of a first image $I_1$ (e.g. the letter "A") as amplitude. The object wave issued to the direction of parallax 2 is turned to a wave, which has the density at pixel position i of a second image $I_2$ (e.g. the letter "B") as amplitude. Similarly, the object wave 1 emitted in the direction of parallax 8 is turned to a wave, which has the density at pixel position i of an eighth image $I_8$ (e.g. the letter "H") as amplitude.

An object wave 1 is generated, which has the densities at the pixel position i of the letters "A", "B", . . . "H" at the same time depending on the direction of parallax. The object wave 1 is as given in the equation (1').

Here, it is supposed that incident vector of the reference light 2, which consists of parallel lights entering the CGH 12, is ($R_x$, $R_y$, $R_z$), that the amplitude of the wavelength $\lambda_c$ is $R_{WLc0}$, and that the phase at the origin of the coordinates is $\phi_{RWLc}$. Then, the complex amplitude value $R_{WLc}$ ($x_2$, $y_2$, $z_2$) of the reference light 2 is given, as in the case of FIG. 1, as follows:

$$R_{WLc}(x_2,y_2,z_2) = R_{WLc0} \cdot \exp[j\{(2\pi/\lambda_c) \times (R_x x_2 + R_y y_2 + R_z z_2)/(R_x^2 + R_y^2 + R_z^2)^{1/2} + \phi_{RWLc}\}] \quad (2)$$

The intensity value $I_{WLc}$ ($x_2$, $y_2$, $z_2$) of interference fringes caused by the object wave 1 and the reference light 2 at $P_j$ ($x_2$, $y_2$, $z_2$) is given similarly as:

$$I_{WLc}(x_2,y_2,z_2) = |O_{WLc}(x_2,y_2,z_2) + R_{WLc}(x_2,y_2,z_2)|^2 \quad (3)$$

In the above, the distance $r_{ij}$ between $Q_i$ and $P_j$ is given as:

$$r_{ij} = \{(x_2 - x_1)^2 + (y_2 - y_1)^2 + (z_2 - z_1)^2\}^{1/2} \quad (4)$$

The angle $\theta_{xz}$ with respect to z-axis when the straight line $Q_iP_j$ is incident to the plane x-z is:

$$\theta_{xz} = \tan^{-1}\{(x_2 - x_1)/(z_2 - z_1)\} \quad (5)$$

The angle $\theta_{yz}$ with respect to z-axis when the straight line $Q_iP_j$ is incident to the plane y-z is given as:

$$\theta_{yz}=\tan^{-1}\{(y_2-y_3)/(z_2-z_1)\} \quad (6)$$

The phase $\phi_{WLci}$ at the virtual light converging point $Q_i$ is set to a constant value between the virtual light converging points $Q_i$ regardless of the relation to each other.

As it is evident from the above description, a multiple of the virtual light converging points $Q_i$ ($x_1$, $y_1$, $z_1$) are set up on planes of a plurality of images $I_{11}, I_{21}, \ldots, I_{mn}$ recordable and reproducible on the same plane as the CGH 12. Luminance angular distribution $T_{WLci}$ ($\theta_{xz}$, $\theta_{yz}$) of convergent light entering each of the virtual light converging points $Q_i$ is divided by angular division depending on the direction of radiant angle. Within different divided angle, luminance equal to the density $I_{11i}, I_{21i}, \ldots, I_{mni}$ at the position of the virtual light converging point $Q_i$ of different images $I_{11}, I_{21}, \ldots, I_{mn}$ is set up, and initial phase $\phi_{WLci}$ of the virtual light converging point $Q_i$ is set to a constant value between the virtual light converging points $Q_i$ regardless of the relation to each other. The phase and the amplitude of the converging light entering the virtual light converging points $Q_i$ are recorded holographically (recording of interference with the reference 2), and the CGH 12 of the present invention can be obtained, in which the different images $I_{11}, I_{21}, \ldots, I_{mn}$ can be reconstructed depending on the direction of observation.

Figure 5:
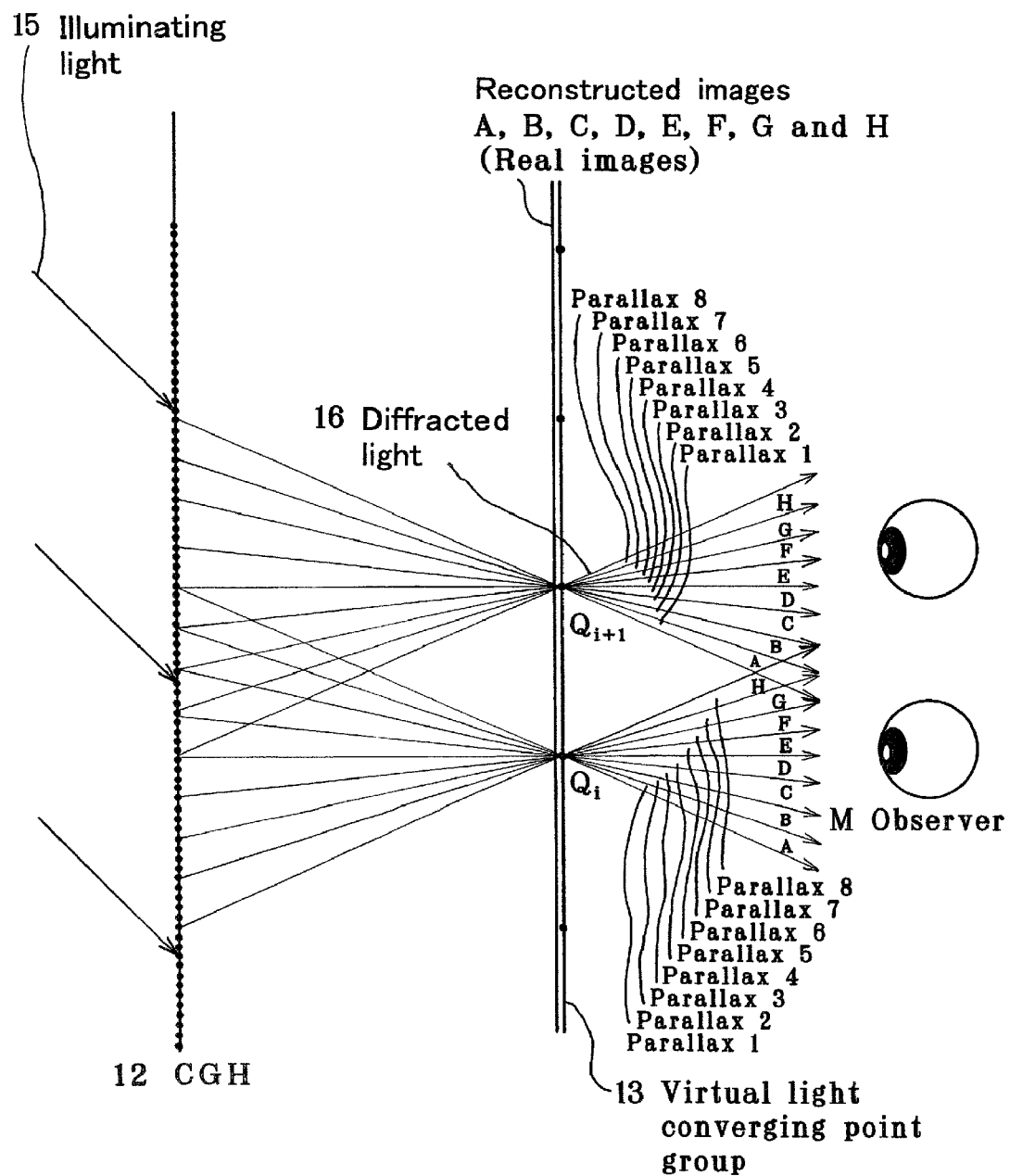
FIG. 5 is a drawing to explain how an observer can selectively observe different images depending on the direction of parallax through the computer-generated hologram as shown in FIG. 4.

When it is designed in such manner that an illuminating light with the same wavelength $\lambda_c$ as the reference light 2 enters the CGH 12 recorded at the same incident angle as the reference light 2 as shown in FIG. 5, the images $I_{11}, I_{21}, \ldots, I_{mn}$ are reconstructed as superimposed on each other on the planes of the virtual light converging point group 13 by the diffracted light 16 diffracted from the CGH 12. However, the diffracted light 16 relating to each of the images $I_{11}, I_{21}, \ldots, I_{mn}$ is divided by angular division depending on the direction of diffraction angle. From the position of the virtual light converging point $Q_i$ ($x_1$, $y_1$, $z_1$) on the planes of the virtual light converging point group 13, the diffracted light 16 to reconstruct the image $I_{11}$ is diffracted in the ranges of $\theta_{xz0} \sim \theta_{xz1}$ and $\theta_{yz0} \sim \theta_{yz1}$. The diffracted light 16 to reconstruct the image $I_{21}$ is diffracted in the range of $\theta_{xz1} \sim \theta_{xz2}$ and $\theta_{yz0} \sim \theta_{yz1}$, and diffracted light 16 to reconstruct the image $I_{mn}$ is diffracted in the ranges of $\theta_{xzm-1} \sim \theta_{xzm}$ and $\theta_{yzn-1} \sim \theta_{yzn}$.

Explaining in simpler manner by referring to FIG. 5, by the diffracted light 16 emitted in the direction of parallax 1 from the virtual light converging point $Q_i$ ($x_1$, $y_1$, $z_1$), it is turned to a wave, which has the density of pixel at the position of the virtual light converging point $Q_i$ ($x_1$, $y_1$, $z_1$) of a first image $I_i$ (e.g. the letter "A") as amplitude. By the diffracted light 16 emitted in the direction of parallax 2, it is turned to a wave, which has the density of pixel at the position of the virtual light converging point $Q_i$ ($x_1$, $y_1$, $z_1$) of a second image $I_2$ (e.g. the "B") as amplitude. Similarly, the object wave 1 emitted in the direction of parallax 8 is turned to a wave, which has the density of pixel at the position of the virtual light converging point $Q_i$ ($x_1$, $y_1$, $z_1$) of an eighth image $I_8$ (e.g. the letter "H") as amplitude. When the observer M observes the direction of parallax, these images "A", "B", . . . , "H" can be selectively observed depending on the direction of parallax as an assembly of all pixels on the planes of the virtual light converging point group 13. Also, when the observer shifts the view point, these images "A", "B", . . . , "H" can be observed as if these are changed over with each other.

Figure 6:
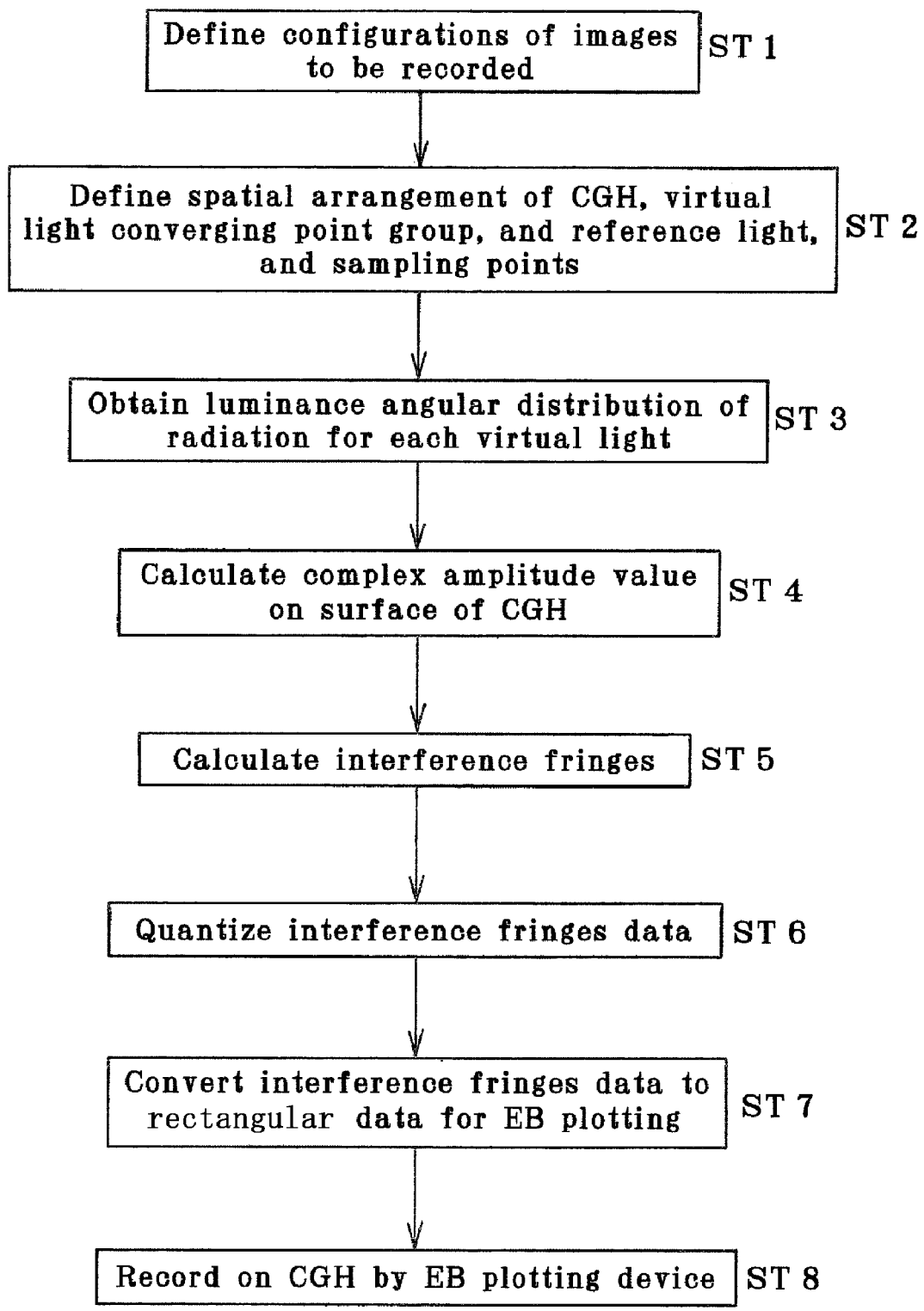
FIG. 6 is a flow chart to explain a method for preparing the computer-generated hologram as shown in FIG. 4.

Next, description will be given on a method to prepare the CGH 12 as a binary hologram by referring to FIG. 6. In Step ST1, a plurality of the images $I_{11i}, I_{21i}, \ldots, I_{mni}$ to be turned to the CGH are defined. Next, in Step ST2, spatial arrangement of the CGH 12, the virtual light converging point group 13, and the reference light 2 as well as a sampling point ($Q_i$) of the virtual light converging point group 13 and a sampling point ($P_j$) of the CGH 12 are defined. Then, in Step ST3, luminance angular distribution $T_{WLci}$ ($\theta_{xz}$, $\theta_{yz}$) is divided by angular division depending on the direction of radiant angle for each virtual light converging point, and it is obtained as the luminance equal to the densities $I_{11i}, I_{21i}, \ldots, I_{mni}$ at the position of the virtual light converging point $Q_i$ of the different images $I_{11}, I_{21}, \ldots, I_{mn}$ within different divided angle. Then, in Step ST4, the complex amplitude value $O_{WLc}$ ($x_2$, $y_2$, $z_2$) of the object light on the plane of the CGH 12 and the complex amplitude value $R_{WLc}$ ($x_2$, $y_2$, $z_2$) of the reference light 2 are calculated by using the equations (1') and (2). Then, in Step ST5, the intensity of interference fringes of the object light and the reference light can be obtained at each of the sampling points defined on the plane of the CGH 12 by using the equation (3). Next, in Step ST6, the data of interference fringes thus obtained are quantized. In Step ST7, the data are converted to rectangular data for EB lithography. In Step ST8, the data are recorded on a medium by EB lithography device, and the CGH 12 can be obtained.

In the case shown in FIG. 4, it is designed in such manner that the object wave entering the virtual light converging point $Q_i$ enters all of the cells $P_j$ of the CGH 12 in x direction and y direction. However, it may be designed in such manner that the virtual light converging point group 13 and the CGH 12 are cut by a multiple of slicing planes perpendicular to y-axis, and radiation range of the object wave is limited within the slicing planes.

Also, in FIG. 4, the light converging points within 2-dimensional plane are used as the virtual light converging points, while a light converging line extending in y direction and not spreading in y direction may be used.

Further, in the case of FIG. 4, a procedure based on the interference with the reference light 2 is adopted for the purpose of fixing the complex amplitude value $Q_{WLc}$ ($x_2$, $y_2$, $z_2$) of the object light 1 as hologram, while the method of Lohmann or the method of Lee (non-patent reference 1) to directly reconstruct the complex amplitude of the object wave may be used. Also, the method proposed by the present inventor in the patent reference 2 may be used.

Further, in the description given for FIG. 4, the density of pixel at the position of the virtual light converging point $Q_i$ is used as the value of the image corresponding to the luminance angular distribution $T_{WLci}$ of the converging light to be converged to each of the virtual light converging points $Q_i$, while it is not limited to this, and a value in a certain fixed relation with the density of the pixel may be used. For instance, by supposing that the density is X, the value $\sqrt{X}$, $X^{1/a}$ may be used (where "a" is a constant").

A plurality of images to be recorded on the CGH 12 of the present invention as described above may be parallax images obtained by changing the direction of observation of a 3-dimensional object or of a changeable picture, which is turned to an entirely different picture when the direction 1C of observation is changed, or a series of animation images to be changed when the direction of observation is changed.

Further, the divergent light emitted from the virtual point light source or the converging light converged at a virtual light converging point may be recorded on the plane of the CGH 12 so that these light components may be superimposed on the divergent light from adjacent virtual point light source or on convergent light converged to adjacent virtual light converging point, or these may be recorded separately from each other and not superimposed on each other. In other words, in the former case, when the spacing of arrangement of the virtual point light source or virtual light converging points is narrower than the width of the object wave from one point light source or from the light converging point spreading on the plane of CGH, the number of the images to be recorded increases, and the resolution is also turned to be higher, while noise may be increased because interference fringes are superimposed on each other. With regard to angular division in x direction and y direction of the luminance $A_{WLci}(\theta_{xz}, \theta_{yz})$ and the luminance $T_{WLci}(\theta_{xz}, \theta_{yz})$, may be equal angle division or angle division to have equal spacing on the plane of the CGH 12 or may be the other division. In case the images are recorded as superimposed on the plane of the CGH, if the initial phase $\phi_{WLci}$ is set to a constant value regardless of the relation to each other, unevenness in the reconstructed image is decreased, and this contributes to the improvement of the quality of the images. In case the images are not superimposed on the plane of the CGH, the initial phased $\phi_{WLci}$ may be set to a constant value so that these are related to each other.

If the distance of the image from the plane of the CGH is set to within 1 mm, more distinct image can be obtained, and this is desirable.

Also, in the computer-generated hologram of the present invention, it may be arranged in such manner that the hologram of FIG. 1 and the hologram of FIG. 4 are present and recorded in parallel to each other within the hologram.

In the above, description has been given on the computer-generated hologram of the present invention based on its principle, while the invention is not limited to these embodiments, and various changes and modifications can be made.

INDUSTRIAL APPLICABILITY

As it is evident from the above description, according to the computer-generated hologram of the present invention, on a plane where a plurality of images are reconstructed and which is separated from the plane of the hologram, a multiple of virtual point light sources with luminance of the positions of the images different depending on radial direction or a multiple of virtual light converging points with luminance equal to the luminance of the positions of the images different depending on light converging direction are defined. Light components radiated from these virtual point light sources or light components converged to these virtual light converging points are regarded as virtual object light, and a computer-generated hologram is prepared using these light components. The present invention makes it possible to provide, for instance, a computer-generated holographic stereogram with high resolution and with many numbers of parallaxes.

What is claimed is:

1. A computer-generated hologram for selectively reproducing a plurality of images depending on a direction of observation where complex amplitude of an object wave is recorded, wherein:

a virtual point light source group is set up spatially on a side opposite to the observation side of the hologram, luminance angular distribution of divergent light diverged from each of a virtual point light source of said virtual point light source group toward the observation side is divided by angular division, and within a divided angle, among multiple images positioned on a plane of said virtual point light source group, a divergent light to be equal to divergent light diverged from a point with amplitude equal to a density of pixel of the image corresponding to each of divided angle at the position of a virtual point light source or equal to a value in a certain fixed relation with a density of the images is recorded as an object light at one of positions on the observation side of the virtual point light source group.

2. A computer-generated hologram according to claim 1, wherein each of the virtual point light sources in said virtual point light source group is a point where a spreading direction of light is mono-dimensional, and said virtual point light source comprises a linear light source extending in a direction perpendicular to the spreading direction.

* * * * *